US008019585B2

(12) United States Patent
Rahman et al.

(10) Patent No.: US 8,019,585 B2
(45) Date of Patent: Sep. 13, 2011

(54) SYSTEMS AND METHODS FOR CRITICAL NODE FILTERING OF INTEGRATED CIRCUITS

(75) Inventors: Md. Asifur Rahman, Portland, OR (US); Dan Bockelman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 11/904,102

(22) Filed: Sep. 26, 2007

(65) Prior Publication Data

US 2009/0083600 A1    Mar. 26, 2009

(51) Int. Cl.
*G06F 17/50* (2006.01)
*G06F 9/455* (2006.01)

(52) U.S. Cl. ............. 703/14; 703/15; 716/52; 716/100; 716/112; 716/113

(58) Field of Classification Search ................ 716/4, 51, 716/52, 100, 111, 112, 113; 703/14, 15; 700/97
See application file for complete search history.

(56) References Cited

U.S. PATENT DOCUMENTS

| | | | | |
|---|---|---|---|---|
| 5,175,495 | A | * | 12/1992 | Brahme et al. ............... 714/738 |
| 5,325,309 | A | * | 6/1994 | Halaviati et al. ............. 703/15 |
| 6,134,689 | A | * | 10/2000 | Mateja et al. ................ 714/736 |
| 6,671,846 | B1 | * | 12/2003 | Schultz ....................... 714/741 |

OTHER PUBLICATIONS

Killpack et al., Silicon Speedpath Measurement and Feedback into EDA flows, Jun. 4-8, 2007, Design Automation Conference, DAC '07, pp. 390-395.*
Rowlette, Critical Timing Analysis in Microprocessors Using Near-IR Laser Assisted Device Alteration (LADA), 2003, ISBN 0-7803-8106-8, International Test Conference 2003 Proceedings, Washington, D.C., pp. 264-273.*

* cited by examiner

*Primary Examiner* — Paul Rodriguez
*Assistant Examiner* — Juan C Ochoa
(74) *Attorney, Agent, or Firm* — Schubert Law Group PLLC; Neil K. Cohen

(57) ABSTRACT

Systems, apparatuses, methods, and computer program products for performing silicon debugging and isolating faults in integrated circuits are disclosed. Some embodiments comprise a simulator to simulate operation of one or more portions of a circuit in order to identify elements of the circuit which are related to a fault, a circuit pruner to separate the related elements from other elements of the circuit and correlate the related elements to a physical layout of the elements, and a probe tool to locate one or more of the related elements which cause or contribute to the fault. Alternative embodiments may comprise computer programs for simulating operation of a circuit to determine related elements of a fault, correlating the related elements to a physical layout or arrangement of the elements in the circuit, and testing the related elements via the physical layout to determine which elements contribute to the fault.

15 Claims, 4 Drawing Sheets

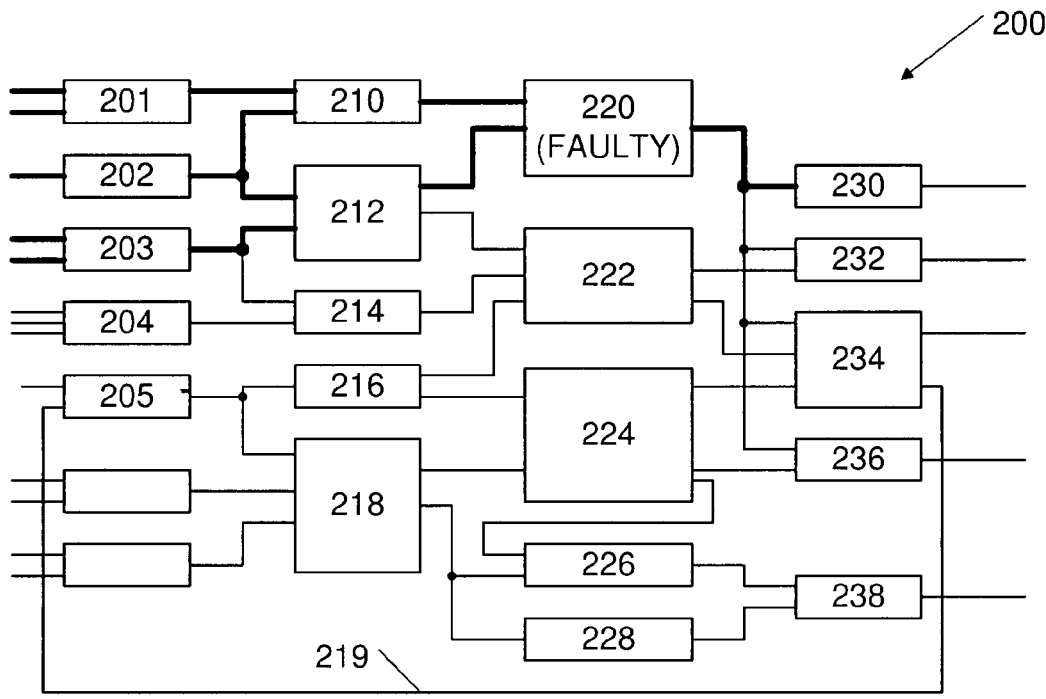
FIG. 2A
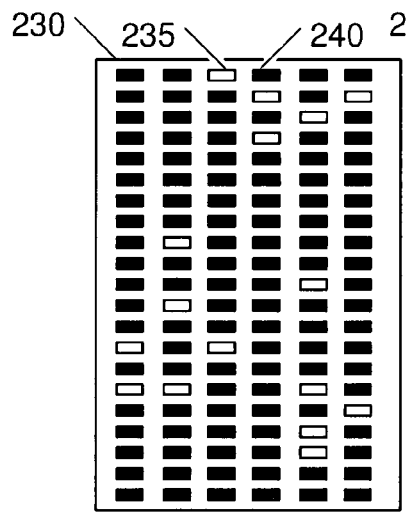
FIG. 2B
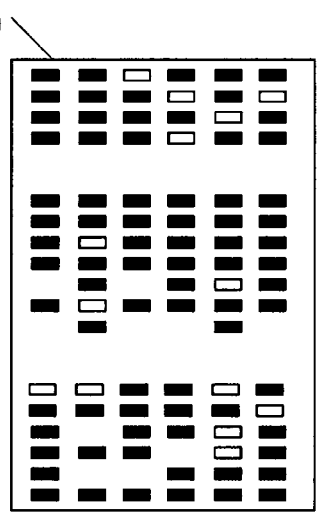
FIG. 2C
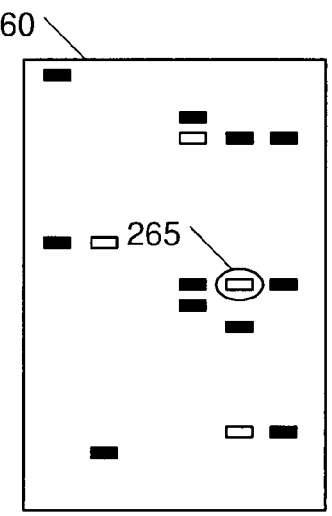
FIG. 2D
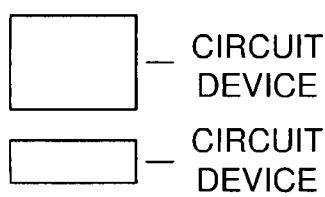
LEGEND
— CIRCUIT DEVICE
— CIRCUIT DEVICE
= — N-DIFFUSION & P-DIFFUSION ELEMENTS
▭ — DIFFUSION ELEMENT SHOWING IREM EMISSION

US 8,019,585 B2

SYSTEMS AND METHODS FOR CRITICAL NODE FILTERING OF INTEGRATED CIRCUITS

FIELD

The embodiments herein generally relate to the field of integrated circuits. More particularly, the embodiments relate to systems, methods, and software for analyzing or debugging integrated circuits.

BACKGROUND

Designers of modern complex integrated circuits (IC), which are increasingly implemented using deep-submicron and nanometer technologies, find that efficient test and debug techniques are indispensable for analyzing and improving the performance of the integrated circuits. Unfortunately, the increasingly smaller geometries of elements in integrated circuits, which place more and more elements in smaller areas and increase the overall number of circuit elements, make silicon testing and debugging more difficult. In fact, activities related to debugging very large scale integration (VLSI) circuits and chips are rapidly becoming major bottlenecks in overall IC production timelines.

Modern VLSI chips have stringent timing requirements due to the deep-submicron and nanometer technologies as well as the increasing complexities of the circuits. Consequently, delay faults and other types of timing errors have emerged as significant problems. Such timing errors may cause an otherwise functional chip to fail as its clock speed increases. Designers use debugging to ensure that the integrated circuits not only function, but that the circuits perform within desired specifications. While designers may use simulation to help ensure that a circuit meets its performance specifications, designers must nonetheless use debugging techniques on the circuit once it has actually been formed or implemented in silicon. Designers must use these silicon debugging techniques to detect faults which stem from numerous causes, such as logic errors, crosstalk, power supply fluctuations, timing errors, and delays due to physical implementation.

Designers use silicon debug probing tools to look at elements on a die, or even multiple elements at the same time. Such tools may allow the designers to locate timing errors and other types of faults by monitoring the operation of the elements of the circuit. The tools allow the designers to compare actual measured or otherwise observed states of the elements with their expected or simulated states. In other words, the designers locate mismatches of circuit elements by comparing the simulated passing cases with the measured or observed failing cases. Unfortunately, when trying to diagnose or analyze actual faults designers presently observe numerous elements that are not necessarily related to an actual failure. For example, the designers may spend time analyzing elements that exhibit mismatches, but those mismatches may be products of the fault and not possible causes. Stated differently, the designers may observe elements that indicate a mismatch, but those elements are not in the input paths to the actual failing node. Consequently, designers may consume considerable time trying to rule out which mismatches are actually related to the failure.

BRIEF DESCRIPTION OF THE DRAWINGS

Aspects of the embodiments will become apparent upon reading the following detailed description and upon reference to the accompanying drawings in which like references may indicate similar elements:

FIG. 2A shows an arrangement of integrated circuit devices that may be analyzed for a fault;

FIG. 2B depicts an example physical arrangement of elements on a backside section of an integrated circuit;

FIG. 2C illustrates groups of elements for a portion of an integrated circuit;

FIG. 2D illustrates a physical layout of remaining elements of an integrated circuit after a pruning operation;

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments; but on the contrary, the intent is to cover all modifications, equivalents, and alternatives consistent with the spirit and scope of the embodiments as defined by the appended claims.

Portions of the following detailed discussion describe many embodiments using the terms "elements" and "devices". A "device" of an integrated circuit may refer to a circuit component, such as a logic gate, a latch, a resistor, etc. An "element" may refer to one or more structural items of a device. For example, a logic "XOR" gate may comprise an arrangement of complimentary metal oxide semiconductor (CMOS) transistors, wherein the parts of the transistors may comprise elements of the "XOR" gate device. However, the terms "device" and "element" may often be interchangeable. In other words, one of ordinary skill in the art will recognize that the term "element" may be interpreted as one of a variety of integrated circuit components, ranging from structural components, like diffusion or metallization, to one or more integrated circuit devices, such as gates, nodes of devices, and latches.

Figure 1A:
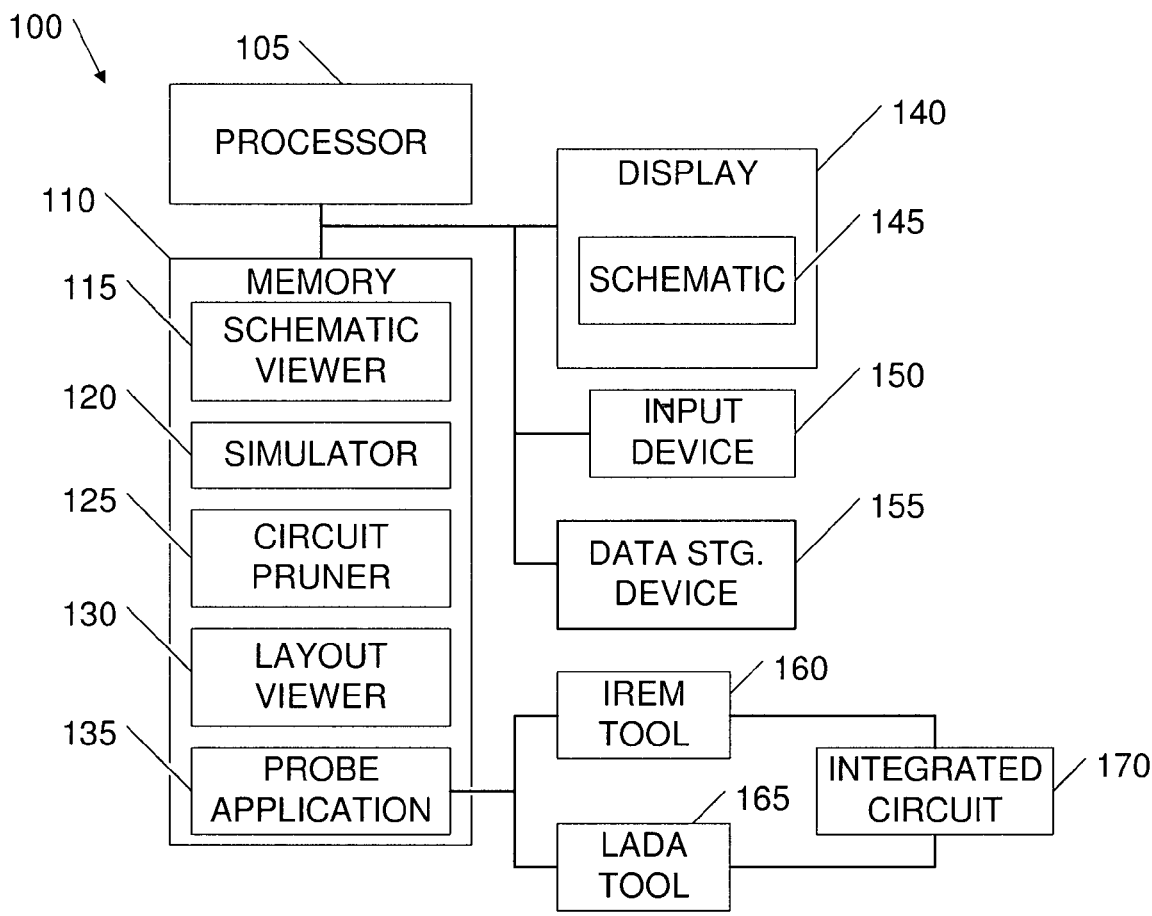
FIG. 1A depicts a system that may be used to analyze an integrated circuit using silicon debugging tools.

Turning now to the drawings, FIG. 1 depicts a system that may be used to analyze an integrated circuit using a variety of silicon debugging tools. For example, one or more embodiments may comprise a system, like system 100, that is able to perform silicon debugging activities on an integrated circuit, such as integrated circuit 170, which may comprise an application specific integrated circuit (ASIC), a microprocessor, a chip, a section of an ASIC, a section of a microprocessor, or a section of a chip. System 100 has a processor 105 coupled to a display 140 and memory 110. System 100 may comprise, as examples, part of a desktop computer, a server platform, a notebook computer, or a supercomputer running one or more silicon debugging software programs. For example, processor 105 may execute instructions for silicon debugging programs running in memory 110, such as a schematic viewer 115, one or more simulator applications like simulator 120, an application to perform circuit element pruning like circuit pruner 125, a layout viewer 130, and one or more probe applications like probe application 135.

Depending on the embodiment, the type of processor used in a system may vary. As examples, in one embodiment processor 105 may comprise a single core reduced instruction set computer (RISC) processor, while in another embodiment processor 105 may comprise a multiple-core, out-of-order complex instruction set computer (CISC) processor. Likewise, the type of memory used in an embodiment may vary from one embodiment to the next. For example, memory 110 may comprise dynamic random access memory (DRAM), static random access memory (SRAM), or both DRAM and SRAM in various embodiments, such as with cache memory and so-called "main" system memory.

In one or more embodiments, the processor of a system may execute instructions of the silicon debugging applications and display a graphic representation of a schematic on a display. For example, schematic 145 may represent a schematic or a least a portion of the schematic for integrated circuit 170. In different embodiments, the type of display device may vary, such as comprising a CRT monitor, a liquid crystal display (LCD) screen, or a thin-film transistor flat panel monitor, as examples.

To save, retrieve, analyze, and modify the circuit elements for schematic 145, the designer may utilize some type of input device, such as input device 150. In some embodiments, the input device may comprise a keyboard. In other embodiments the input device may comprise another type of input device, such as a stylus and a touch-screen or some type of stylus-sensing tablet. The designer may use input device 150 to store the netlist for integrated circuit 170 to a data storage device 155. The type of the data storage device may vary from embodiment to embodiment. In other words, data storage device 155 may comprise a hard drive, a compact disc (CD) or digital versatile disc (DVD) drive, or another type of storage device such as a flash memory "thumb" drive. The designer may also use input device 150 to retrieve the netlist or the data file representing integrated circuit 170 from data storage device 155 and perform a variety of silicon and debugging tasks. For example, the designer may invoke applications such as simulator 120 and layout viewer 130 when analyzing the design for integrated circuit 170.

When performing fault isolation and silicon debugging for integrated circuit 170, a designer may use one or more tools of system 100 to collect electrical data for the performance of integrated circuit 170. For example, the designer may use a scanout tool, an on die clock shrink (ODCS) tool, and/or a locate critical path (LCP) tool to analyze the performance of integrated circuit 170. For example, the designer may use an ODCS tool to locate a speedpath by shrinking the clock, or increasing its frequency, and locating critical clock frequencies where one or more portions of integrated circuit 170 do not perform properly or as expected. For example, as the operating frequency is increased using the ODCS tool, the designer may detect a scan mismatch. In other words, one or more devices or elements of integrated circuit 170 may end up in an improper state or produce an incorrect result. The designer may then work to improve the performance of integrated circuit 170, such as by correcting problems associated with one or more circuit elements which contribute to the unexpected operation or circuit fault.

Once the designer has collected the initial electrical data for the failure, the designer may then use one or more applications, such as simulator 120 and circuit pruner 125, to perform critical node filtering and determine which circuit elements or devices are related to the failure and which elements are unrelated. FIG. 2A may help illustrate which elements or devices may be related to a failure and which elements may be unrelated. FIG. 2A shows an arrangement 200 of integrated circuit devices that may be analyzed for a fault. For example, arrangement 200 may represent circuit devices for a schematic of integrated circuit 170. The types of circuit devices in various arrangements may differ. For example, circuit device 201 may comprise a two-input AND gate, circuit device 202 a buffer, circuit device 204 a three-input XOR gate, and circuit device 218 a latch, counter, or other circuit device. The circuit devices of arrangement 200 are for illustration. Actual arrangements may comprise more simple devices and elements, such as CMOS transistors or structures such as metalization or polysilicon, or more complex devices such as gate arrays, memories, or other items.

Assume as an example that circuit device 220 is a faulty latch. During an analysis, circuit devices 230, 232, 234, and 236 may all produce scan mismatches due to the improper operation of circuit device 220. Additionally, output 219 of circuit device 234 may produce numerous other scan mismatches, such as scan mismatches of circuit devices 205, 216, 218, 222, 224, 226, 228, and 238. As one may see, a single failure of one device may produce numerous scan mismatches. Due to the large number of mismatches, without assistance in narrowing down which elements may actually be related to the fault a designer may spend a considerable amount of time probing and testing the various elements to determine which circuit device or circuit element contributes to the fault.

To help speed diagnosis and locate a fault, the designer may use simulator 120 and circuit pruner 125 to develop a list of elements that are in an input cone for a noted failing node. In other words, simulator 120 may be used to develop a list of elements which may be related to the observed failure. Referring back to FIG. 2A as an example, in analyzing the failure observed at circuit device 230 a circuit pruner may develop a list of elements for circuit devices 220, 210, 212, 201, 202, and 203, and focus on those elements when performing various debugging tasks. In other words, the circuit pruner may develop a list of elements related to the observed failure, and differentiate those elements from elements which could not have contributed to the observed failure. For example, the elements for circuit devices 204, 205, 214, 216, 218, 222, 224, 226, 228, 232, 234, 236, and 238 are unrelated elements since those elements most likely did not contribute to the observed failure of circuit device 230 since they are not included in the input paths for circuit device 230.

Once circuit pruner 125 differentiates the related elements from unrelated elements, circuit pruner 125 may then work in conjunction with schematic viewer 115 to display only the portions of the schematic which are relevant or related to the failure on display 140. For example, circuit pruner 125 may prune the unrelated elements and devices from the netlist for arrangement 200, wherein the condensed netlist may only contain the elements for circuit devices 201, 202, 203, 210, 212, and 220. Using the condensed netlist, schematic viewer 115 may show a pruned schematic on display 140 for the designer to observe. In other words, devices 201, 202, 203, 210, 212, and 220 may represent a pruned "input cone" for the schematic portion of arrangement 200 that may be associated with the fault observed for device 230.

Circuit pruner 125 may also work in conjunction with layout viewer 130 to display the layout or physical arrangement of only the related elements for the pruned input cone. FIG. 2B, FIG. 2C, and FIG. 2D may help illustrate such layout pruning. FIG. 2B depicts an example physical arrangement 230 of elements on a backside section of an integrated circuit die. For example, physical arrangement 230 may represent a backside view of a portion of integrated circuit 170. Physical arrangement 230 may comprise numerous elements, such as numerous N-diffusion and P-diffusion elements. The elements may represent diffusion elements as viewed from an IREM tool while debugging. For example, element 235 may represent an N-diffusion or a P-diffusion element having an infrared emission (white) while element 240 may represent another diffusion element having no infrared emission (black). FIG. 2C illustrates groups of elements 250 for a portion of an integrated circuit. For example, groups of elements 250 may represent the elements for all of the circuit devices shown in arrangement 200 of FIG. 2A. FIG. 2D illustrates an example physical layout 260 of remaining elements of after a pruning operation. For example, the diffusion elements depicted in physical layout 260 may correspond to the condensed netlist having elements related to the observed fault, such as the elements for circuit devices 201, 202, 203, 210, 212, and 220. In other words, while schematic viewer 115 may be used to display only the related circuit elements and/or devices in a circuit schematic format, layout viewer 130 may be used to display only the locations of the related circuit elements in a physical layout or arrangement of integrated circuit 170.

A system like system 100 may then be used to analyze and debug the related elements of integrated circuit 170 using various probing tools. For example, one or more of the silicon debugging applications running in memory 110, such as probe application 135, may work in conjunction with an infrared emission microscope (IREM) tool 160 and a laser-assisted device alteration (LADA) tool 165. Probe application 135 may import the polygons or objects and/or shapes for the layout for the related elements from circuit pruner 125. Continuing with our example for FIGS. 2A through 2D, probe application 135 may import the layout the polygons for elements of circuit devices 201, 202, 203, 210, 212, and 220 from circuit pruner 125. Probe application 135 may then work in conjunction with layout viewer 130 and IREM tool 160 to develop an overlay of the polygons and compare the overlay with the data observed by IREM tool 160 on a cycle-by-cycle basis. The designer may then be able to locate a related element which contributes to the fault by finding which element has a data mismatch with the overlay. For example, while stepping through the cycles probe application 135 and IREM tool 160 may detect an infrared emission mismatch from element 265. In other words, element 265 may have been expected to have no infrared emission according to simulated data for the cycle being observed. Depending on the type of failure, element 265 may or may not immediately direct the designer or probing application 135 to the actual cause of the problem. In such cases, the designer may have to use probe application 135 in conjunction with LADA tool 165 to locate the actual cause. For example, the designer may run probe application 135 and LADA tool 165 to scan a laser across the backside of the silicon to speed up or slow down devices in order to locate speedpaths or to activate defects of the integrated circuit.

The types and numbers of probing tools may vary from embodiment to embodiment. For example, one embodiment may have both an IREM tool and a LADA tool. An alternative embodiment may only have an IREM tool and no LADA tool, while yet another embodiment may have a LADA tool but no IREM tool. Further, alternative embodiments may substitute other types of probing tools, such as one or more of a variety of different mechanical probing tools, electron-beam probing tools, and laser-beam probing tools.

A system may contain other components not shown in FIG. 1. For example, in an alternative embodiment system 100 may also have a communication device, such as a hardware or wireless communication device. System 100 may send or receive the netlist file(s) over the Internet, as well as other analysis and simulation information. Aside from sending and/ or receiving the netlist file(s), the communication device may be used for other purposes. For example one or more silicon debugging applications may run on system 100, while other silicon debugging applications on other systems may also run to simulate and/or optimize the design, which may be necessary when very precise modeling results are desired which require extensive processor-intensive calculations, such as a detailed simulation for the operation of the IC design. Additionally, in further embodiments, a system may not contain some of the components shown for system 100. For example, an alternative system may employ an IREM tool, but no LADA tool. Other alternative embodiments may contain different numbers of the components shown for system 100. For example, one embodiment may have two probe applications, one for an IREM tool and another for a LADA tool. Another embodiment may have two applications for circuit simulation, such as an register transfer level (RTL) simulator and a circuit-level simulator used to simulate the operation of silicon products. Even further alternative embodiments may combine the components to have them multiple functions. For example, an alternative system may combine circuit pruner 125 and simulator 120 into one application, or combine schematic viewer 115 and layout viewer 130 into one application.

Figure 1B:
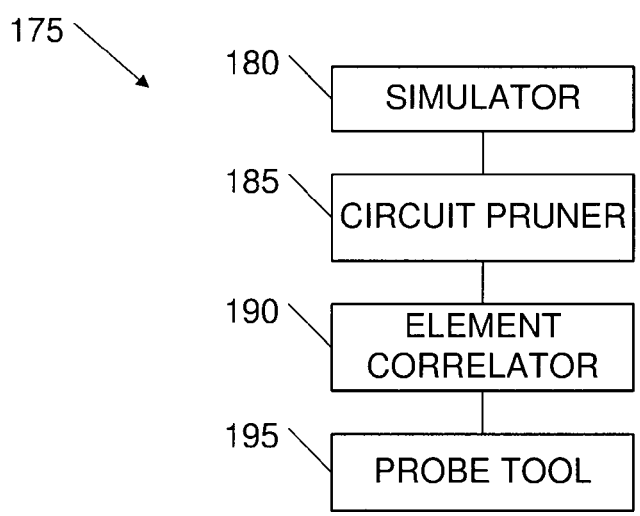
FIG. 1B depicts a silicon debugging apparatus that may analyze an integrated circuit.

FIG. 1B depicts a silicon debugging apparatus 175 that may analyze an integrated circuit. Apparatus 175 may comprise a collection of software, hardware, or combination of software and hardware modules that may be used to analyze or debug an integrated circuit like integrated circuit 170. In one or more embodiments apparatus 175 may comprise a device that simulates the operation of an integrated circuit that has a failure, such as a failure detected by an LCP tool. Apparatus 175 may simulate the operation of the integrated circuit using a simulator module 180. For example, simulator module 180 may comprise an RTL logic simulator or a circuit-level simulator that can handle "do not care" values. Simulator module 180 may work in conjunction with a circuit pruner module 185 to remove or prune unrelated elements, which could not have caused the failure detected by the LCP tool, from the related elements which may be located in the input cone for the known failing circuit node.

Once the unrelated elements have been pruned from the integrated circuit, element correlator module 190 may correlate the remaining related elements to a physical layout of the elements. For example, element correlator module 190 may import a list of the related elements and determine their physical locations in the IC, or the locations of the polygons for those elements. Element correlator module 190 may then work in conjunction with a probe tool module 195 to locate the source of the failure. For example, element correlator module 190 and probe tool module 195 may locate a failing element in the circuit by finding which element has a measured overlay state that mismatches an expected state. That is to say, element correlator module 190 and probe tool module 195 may work in conjunction with each other to find the location of the element or elements causing the failure or speedpath.

In alternative embodiments, an apparatus like apparatus 175 used to debug an integrated circuit may include other modules. In one or more alternative embodiments an apparatus may include additional debugging modules that may collect data for the failure. For example, an alternative embodiment may include an ODCS module and/or a scanout module. Another embodiment may include one or more viewer modules that may allow a designer or technician to view a visual schematic representation of the pruned circuit elements, or view the physical locations of the pruned circuit elements in an integrated circuit layout.

As noted above, one or more of the modules of apparatus 175 may comprise hardware, such as logic circuits and state machines. For example, simulator 180 may comprise a high-speed logic circuit arranged simulate the operation of an integrated circuit in a rapid fashion. In some embodiments, however, one or more of the modules of apparatus 175 may comprise software routines stored in a machine-accessible medium of a system like system 100, such as in memory or on a platter of a hard drive of the system.

One embodiment may be implemented as a program product for use with a design system to analyze and/or debug an integrated circuit, such as an ASIC or a microprocessor integrated circuit. The program(s) of the program product may define functions of the embodiments (including the methods described herein) and may be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of a computer as described herein, represent one or more embodiments.

The routines executed to implement one or more of the embodiments may be part of an operating system or a specific application, component, program, module, object, or sequence of instructions. The computer program may comprise a multitude of instructions that may be translated by a computer into a machine-readable format and hence comprise executable instructions. Also, programs may comprise variables and data structures that either reside locally to the program or are found in memory or on storage devices. In addition, various programs described hereinafter may be identified based upon the application for which they are implemented in a specific embodiment. However, it should be appreciated that any particular program nomenclature that follows is used merely for convenience, and thus an embodiment described should not be limited to use solely in any specific application identified and/or implied by such nomenclature.

The software routines may run in a computer system, such as the applications running in memory 110 for system 100. To illustrate the actions that the software may cause a system or an apparatus to perform, such as system 100 or apparatus 175, we turn now to FIG. 3.

Figure 3:
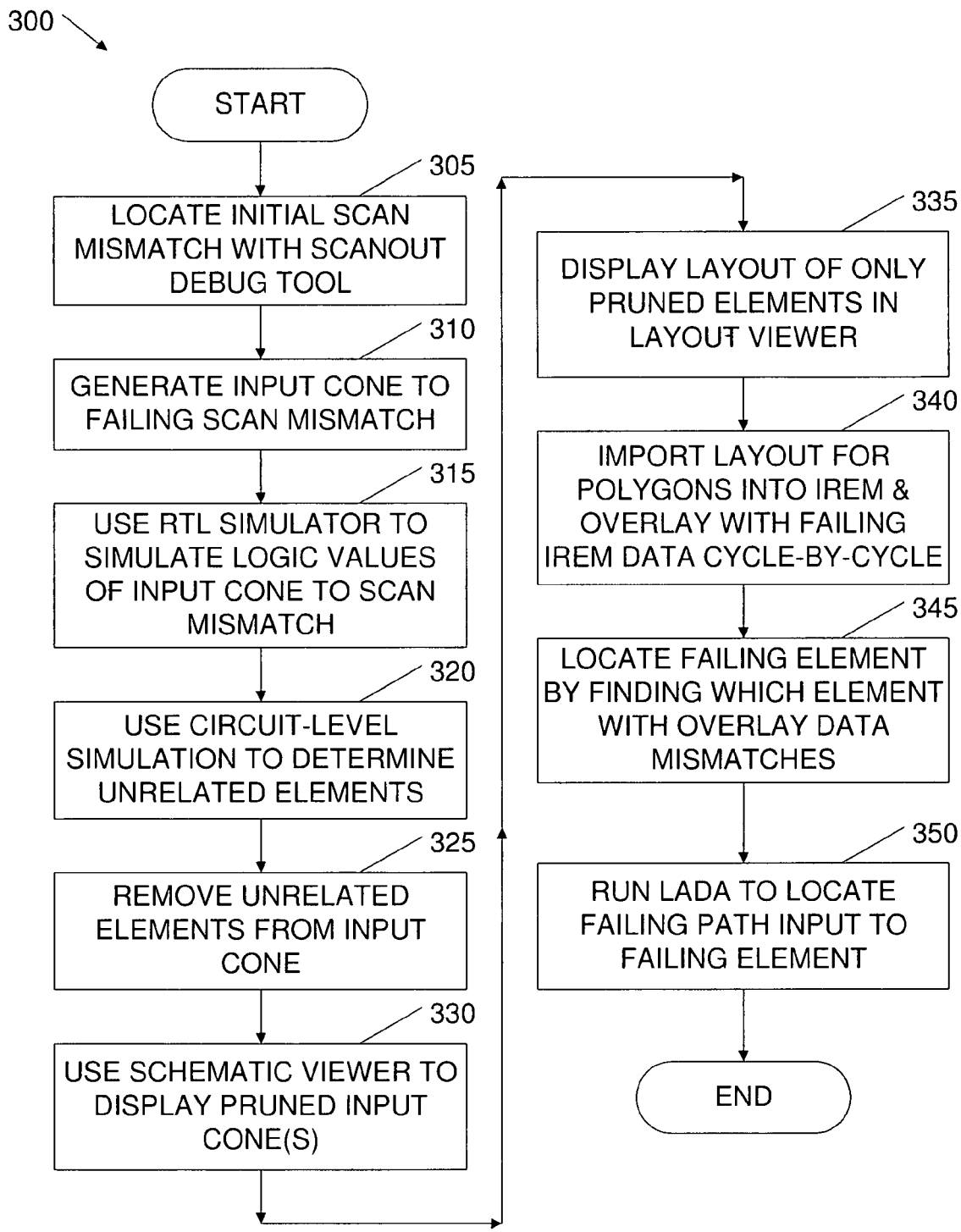
FIG. 3 illustrates a sequence of debugging activities that may be used to find or isolate a fault of an integrated circuit.

FIG. 3 illustrates a sequence 300 of debugging activities that may be used to isolate or find a fault of an integrated circuit. For example, sequence 300 may represent a series of operations that debugging software may perform, either in an automated fashion or under the supervision and controlled interaction of a designer, to isolate either speedpaths or circuit defects in an efficient manner. In other words, sequence 300 may be used by a system or an apparatus to reduce the area to be looked at by silicon probing tools by removing or "filtering out" elements and/or devices unrelated to critical nodes in speedpaths or associated with circuit defects.

Sequence 300 begins by locating an initial scan mismatch with a scanout debugging tool (element 305). Alternative variations of sequence 300 may optionally substitute and/or include the use of other silicon debugging tools, such as an LCP tool or an ODCS tool. Based on the information provided by the scanout debugging tool or other silicon debugging tools, sequence 300 may continue by generating an input cone to the failing scan mismatch (element 310). For example, sequence 300 may include the use of a schematic viewer and netlist extraction tool (SVNET) to view schematic input cones and extracting the netlist of the cones for use with one or more simulations. If LCP information is available, the input cone may be limited to those paths between the LCP domains. For the case of a circuit defect, the sequence may include generating the input cone as far back as the previous scan nodes in the SVNET.

Sequence 300 may continue by using an RTL simulator to simulate logic values for the input cone to generate the condition for the scan mismatch signal(s) (element 315). One or more embodiments employing sequence 300 may then run a circuit-level simulation of the input cone, using a simulator capable of simulating the operation of silicon devices, to determine which nodes or elements could not have caused the observed scan mismatch (element 320). Upon determining which elements are unrelated to the scan mismatch (element 320), an embodiment employing sequence 300 may then remove the unrelated elements from the input cone (element 325). For example, circuit pruner 125 may remove or prune the elements for circuit devices 204, 205, 214, 216, 218, 222, 224, 226, 228, 232, 234, 236, and 238, wherein those elements are unrelated (could not have contributed) to the observed failure of circuit device 230 since they are not included in the input cone for circuit device 230.

One or more embodiments employing sequence 300 may then continue by using a schematic viewer, such as SVNET, to display the resulting pruned input cone(s) (element 330). The one or more embodiments may also use a layout viewer to display the layout of only the pruned input cone(s) (element 335). For example, the layout viewer may comprise a computer aided design (CAD) or computer aided manufacturing (CAM) program that allows a designer to see or visualize the mask layers of a silicon device. Some embodiments may include both a schematic viewer and a layout viewer to display the pruned input cones. However, some embodiments may employ only a schematic viewer or only a layout viewer. Even further alternative embodiments, such as those that operate with limited or no interaction by the designer, may use neither a schematic viewer nor a layout viewer.

An embodiment employing sequence 300 may then continue by importing the layout of the related elements, or polygons for the elements, into an IREM application and produce one or more overlays corresponding to the physical locations of the related elements on the integrated circuit (element 340). Alternatively, the layout of the related elements may be imported into another type of probe application, such as an LADA application. The IREM or LADA application(s) may need to work in conjunction with IREM and/or LADA probe tools for several cycles in order to reproduce the scan mismatch (element 340).

Sequence 300 may then involve locating the failing element by finding which element has a mismatch corresponding to the overlay elements (element 345). For example, the IREM and/or LADA application(s) may then probe or otherwise observe the operation of only the related elements, trying to detect a where one of more of the elements do not behave as expected, such as element 265 in FIG. 2D. Sequence 300 may continue by running the LADA application to pinpoint the location of the failing input path for the observed failure (element 350). For example, the LADA application may automate the operation of the LADA tool to scan a laser over the backside of the silicon for the integrated circuit section in order to speed up or slow down devices to locate speedpaths or otherwise activate defects.

As noted previously, sequence 300 may represent a series of operations that debugging software may perform to isolate speedpaths or circuit defects in an integrated circuit. Sequence 300 may therefore represent a detailed series of events that may be carried out by a designer using a system or an apparatus. One should note that not all embodiments will perform all of the actions described for FIG. 3. Additionally, numerous embodiments may perform other actions in addition to those actions illustrated by FIG. 3 and its associated discussion.

Figure 4:
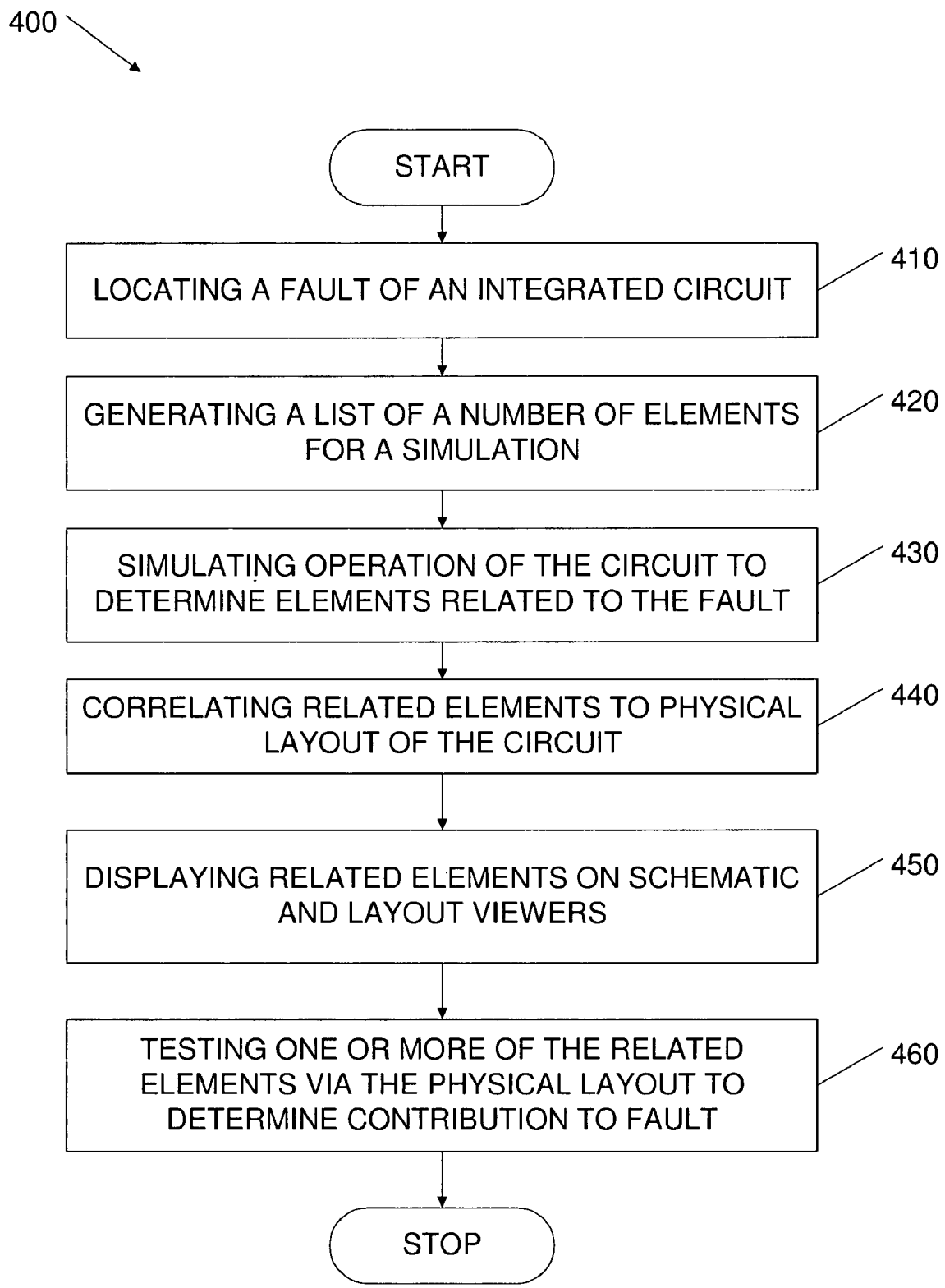
FIG. 4 illustrates a method of pruning unrelated circuit elements from an integrated circuit while debugging the integrated circuit.

FIG. 4 depicts a flowchart 400 illustrating a method of pruning unrelated circuit elements from an integrated circuit while debugging the integrated circuit. Flowchart 400 begins with a locating a fault of an integrated circuit (element 410). For example, a designer may use an ODCS tool and/or an LCP tool to locate one or more speedpaths of an integrated circuit by manipulating clock timings. An embodiment according to flowchart 400 may continue by generating a list of a number of elements for simulation (element 420). For example, a designer or a software application may generate a list of elements for an input cone associated with the failing scan mismatch, such as by using an SVNET to view schematic input cone, and extract a netlist of elements associated with the observed failure for use with one or more simulations.

An embodiment according to flowchart 400 may continue by simulating operation of the circuit to determine elements related to the fault (element 430). For example, the designer or debugging system may run an RTL simulation and/or a circuit-level simulator. An embodiment according to flowchart 400 may continue by correlating related elements, such as those elements included in the input cone of the condensed netlist, to a physical layout of the circuit (element 440). For example, layout viewer 130 may import the polygons for the elements included in the condensed netlist and determine their physical locations on an actual physical arrangement of the integrated circuit.

The method of flowchart 400 may then optionally display the related elements using a schematic viewer and a layout viewer (element 450) before testing one or more of the related elements via the physical layout to determine whether one or more of the related elements contribute to the fault (element 460). For example, an IREM application and IREM probe tool may develop an overlay of the polygons and compare the overlay with the operating data observed by the IREM tool in a series of cycles. Based on the results of the debugging performed with the IREM application and IREM probe tool, a designer may then be able to locate which of the related elements actually causes or contributes to the fault, using a scan mismatch associated with the overlay.

It will be apparent to those skilled in the art having the benefit of this disclosure that the embodiments herein contemplate systems, apparatuses, methods, and computer program products for performing silicon debugging and isolating faults in integrated circuits. Such systems, apparatuses, methods, and computer program products may allow for either speedpaths or circuit defects to be isolated in an efficient manner by removing or filtering out devices or elements that are unrelated to a fault, such as elements not in the input path to the fault. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A computer system, comprising:
a debug tool to produce a scan mismatch of a circuit, wherein the scan mismatch is due to one of a speedpath and a defect of the circuit;
a circuit pruner to generate an input cone to the location of the scan mismatch, wherein the input cone comprises elements of the circuit that may cause the scan mismatch;
a simulator to simulate logic values of the input cone to identify a subset of the elements of the circuit that may cause the scan mismatch and unrelated elements that do not contribute to the scan mismatch;
a circuit pruner is configured to separate the unrelated elements from the subset of the elements for a correlation of the subset of elements to a physical layout of the circuit, wherein at least one of the circuit pruner, the simulator, and the circuit pruner comprise instructions stored in memory of the computer system, the instructions which when executed by a processor cause the processor to perform operations for at least one of generating the input cone, simulating the logic values, and separating the unrelated from the subset of the elements; and
an infrared emission microscope (IREM) tool to locate, via locations of polygons of the subset of elements imported and overlayed to the physical layout, at least one element of the subset of the elements that contributes to the scan mismatch, wherein the location of the at least one element of the subset is determined via an observation from the IREM of the polygons for a plurality of cycles of operation of the circuit.

2. The computer system of claim 1, wherein the debug tool comprises a silicon debug tool configured to collect electrical data for the scan mismatch, and wherein the silicon debug tool comprises one of a locate critical path (LCP) tool, an on die clock shrink (ODCS) tool, and a scanout tool.

3. The computer system of claim 1, wherein the simulator comprises a register transfer level (RTL) simulator.

4. The computer system of claim 2, further comprising a schematic viewer to display the subset of the elements of the circuit.

5. The computer system of claim 4, further comprising a layout viewer to display the physical layout of the subset of elements of the circuit.

6. The computer system of claim 1, further comprising a laser-assisted device alteration (LADA) tool to locate at least one failing path for the at least one element of the subset.

7. The computer system of claim 6, wherein the simulator is configured to perform a circuit-level simulation for the input cone.

8. The computer system of claim 7, further comprising at least one of an ODCS tool to locate the speedpath by increasing the frequency of the clock and an LCP tool to analyze the performance of integrated circuit.

9. A non-transitory machine-accessible medium containing stored instructions, which when executed by a processor, cause the processor to perform operations for analyzing a circuit, the operations comprising:
 debugging a circuit to produce a scan mismatch, wherein the scan mismatch is due to one of a speedpath and a defect of the circuit;
 generating an input cone to the location of the scan mismatch, wherein the generating the input cone comprises generating a list of elements of the circuit that may cause the scan mismatch;
 simulating logic values of the input cone to identify a subset of the list of elements of the circuit that may cause the scan mismatch and identify unrelated elements that do not contribute to the scan mismatch;
 separating the unrelated elements from the subset of the elements for a correlation of the subset of elements to a physical layout of the circuit; and
 locating, via an infrared emission microscope (IREM) tool and polygons of the subset of elements imported and overlayed to the physical layout, at least one element of the subset of the elements that contributes to the scan mismatch, wherein the locating the at least one element of the subset is comprises enabling observation from the IREM the polygons for a plurality of cycles of operation of the circuit.

10. The non-transitory machine-accessible medium of claim 9, wherein the debugging the circuit to locate the scan mismatch comprises debugging the circuit to locate the scan mismatch via at least one of a scanout tool, a locate critical path (LCP) tool, and an on die clock shrink (ODCS) tool.

11. The non-transitory machine-accessible medium of claim 10, the operations further comprising generating a list of the number of elements for the simulation.

12. The non-transitory machine-accessible medium of claim 10, wherein the simulating logic values of the input cone comprises executing at least one of a register transfer level (RTL) simulation and a circuit-level simulation.

13. The non-transitory machine-accessible medium of claim 12, the operations further comprising displaying only the subset of elements via at least one of a schematic viewer and a layout viewer.

14. The non-transitory machine-accessible medium of claim 13, the operations further comprising operating a laser-assisted device alteration (LADA) to locate a failing path input to the at least one element of the subset.

15. The non-transitory machine-accessible medium of claim 14, the operations further comprising increasing, via an ODCS tool, a frequency of a clock to locate the speedpath and analyzing, via an LCP tool, the performance of integrated circuit.

* * * * *